Sept. 15, 1942.    M. F. BURNS, JR    2,296,087
RIVET CUTTER
Filed March 19, 1941    2 Sheets-Sheet 1
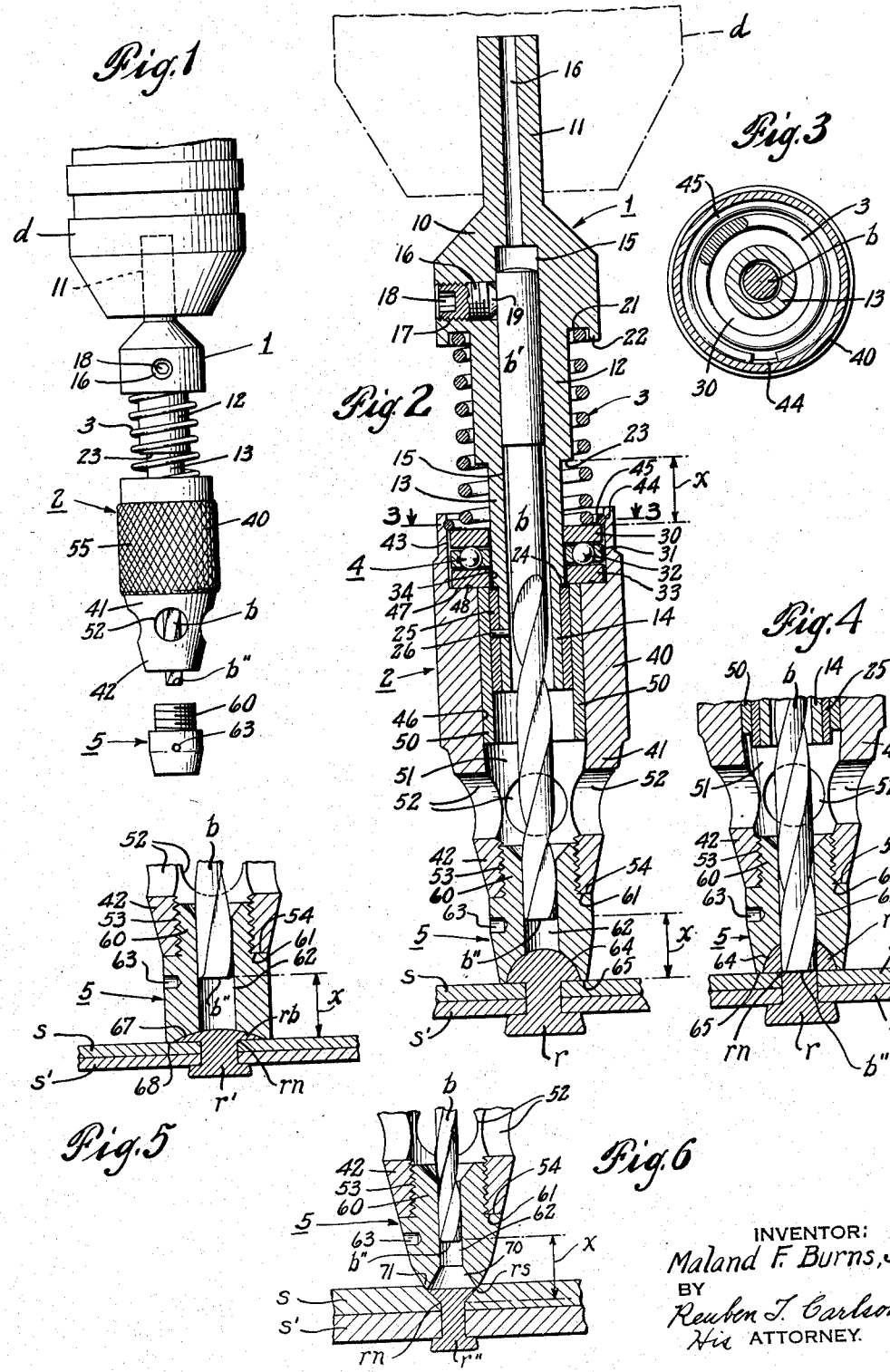
INVENTOR:
Maland F. Burns, Jr.
BY Reuben T. Carlson
His ATTORNEY.

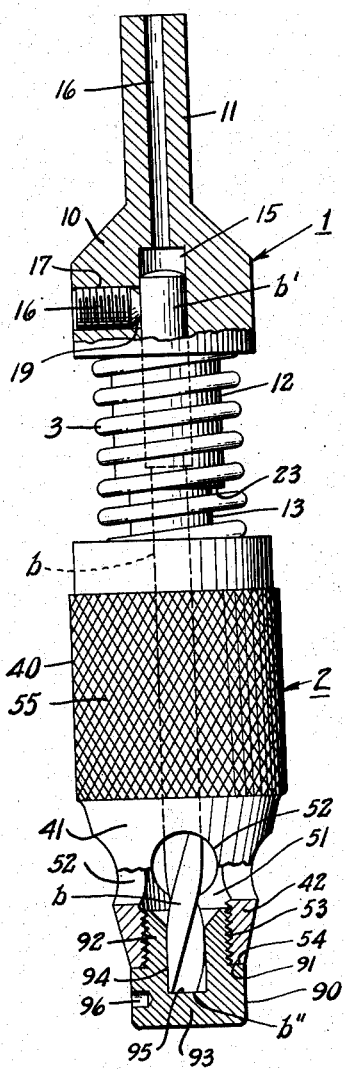
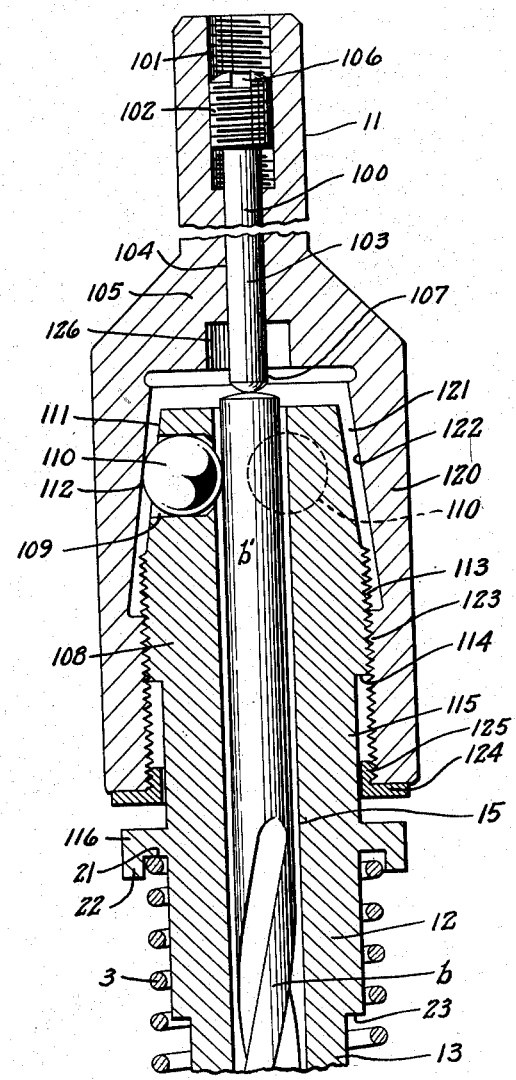
Fig. 7
Fig. 8

Patented Sept. 15, 1942

2,296,087

UNITED STATES PATENT OFFICE 2,296,087

RIVET CUTTER

Maland F. Burns, Jr., Brooklyn, N. Y.

Application March 19, 1941, Serial No. 384,095

18 Claims. (Cl. 77—5)

This invention relates to rivet cutters, and more particularly to a precision tool for drilling the heads of rivets so that the rivets can be removed.

Rivets of various types, shapes and sizes are extensively used in numerous arts to secure together structural parts. In riveting such structural parts, some of the rivets are defectively applied so that they do not properly hold and secure the structural parts together, thus necessitating removal of the rivets. It is also necessary to remove defective and loose rivets in repairing structural parts and members in numerous arts. In the aircraft industry, for example, thousands of rivets are used in each airplane to secure together the metal plates and bracings which form parts of the wings and fuselage. Since the members and sheet metal used are of light gauge, it is essential that each rivet be firmly and properly positioned so that the riveted member will withstand the stress and strain expected of it. In the airplane industry, it has therefore been customary to carefully inspect each rivet before the airplane is put into use to spot and locate any defective rivets. Such defective rivets must be removed and then replaced by a fully effective rivet.

No satisfactory devices have heretofore been provided by which defective rivets can be quickly removed without frequent damage to the plate or structural member which the rivet secures and without distortion, enlargement, or disfigurement of the rivet hole. This problem is especially serious in aircraft manufacture where the metal sheets and members are relatively light and of small gauge and where the parts are subjected to unusually high stresses and which parts would be seriously weakened by any damage to the plates or members or enlargements of the rivet holes. Occasionally whole plates and members or sections thereof must be removed as a result of damage occurring during the operation of removing the defective rivets by methods heretofore practised.

Chiseling and cutting of the rivet heads as now frequently practised is not only tedious and time-consuming but results in damage to the plate or structural part as well as enlargement and distortion of the rivet hole. Electric drills have also been used but no practical guide devices have been provided for holding the drill on the rivet head, so that the cutting end of the drill bit often whirls off the head of the rivet and injures the plate or structural part secured by the rivet. It is, further, almost impossible to manually hold the drill bit accurately on the rivet head so that the drill hole will accurately align with the rivet shank. Further, no means have heretofore been provided to gauge the depth of the hole drilled in the rivet so that the drilled hole will extend to the neck point of the rivet and no farther. This drilling operation as now used is dangerous to the workman due to flying metal shavings, is tedious and time-consuming, and requires workmen of high skill. The blow torch method of removing rivets is also tedious and time-consuming, often injures the plate or structural parts which are riveted, and constitutes a serious fire hazard under certain operating conditions where oil or explosive gases are present.

An object of this invention is to provide a precision instrument whereby relatively unskilled workmen can remove defective rivets at high speed without damage or injury to the metal plates or structural parts held by the rivets and without enlargement or distortion of the rivet holes.

Another object of this invention is to provide a highly practical and efficient tool for removing rivet heads from various types and sizes of rivets.

Another object of this invention is to provide a tool which may be connected to a driving unit and receive a standard drill bit and which is provided with means for automatically centering the end of the bit on the rivet in true alignment with the rivet shank.

Another object of this invention is to provide a tool adapted to receive a drill bit and having positive means for gauging and limiting the depth of the hole drilled into the head of the rivet and accurately center it in alignment with the rivet shank.

Another object of this invention is to provide a rivet cutter equipped with a safety device which discharges the removed shavings and metal particles in a manner which prevents injury to the operator.

A further object of this invention is to provide a rivet cutter adapted to receive and hold drill bits of various sizes, to which a selected assortment of bit guides may be attached for guiding the bit, centering the bit on the rivet, and gauging the depth of the hole drilled into the rivet head.

Another object of this invention is to provide means which may be associated with the rivet cutter for accurately gauging the operating position of the drill bit.

Various other objects, features and advantages of the invention will be apparent from the following particular description and from an inspection of the accompanying drawings.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which:

Fig. 1 is a side view of the improved rivet cutter shown attached to the chuck of a power drill with the drill bit in position but with the bit guide detached;

Fig. 2 is an enlarged longitudinal cross-sectional view through the rivet cutter with the drill bit and bit guide in position to cut the round head of a rivet;

Fig. 3 is a transverse cross-sectional view through the rivet cutter as it appears when looking in the direction of the arrows 3—3 of Fig. 2;

Fig. 4 is a longitudinal cross-sectional view through the lower portion of the rivet cutter, showing the parts as they appear when the drill bit has cut through a round head of a rivet;

Fig. 5 is a fragmentary longitudinal cross-sectional view through the lower portion of the rivet cutter, showing the type of bit guide used for drilling a brazer head rivet;

Fig. 6 is a fragmentary longitudinal cross-sectional view through the lower portion of the rivet cutter, showing the type of bit guide used for drilling a countersunk rivet;

Fig. 7 is a side view of the rivet cutter partly in section showing the removable test cap attached thereto which may be used to determine the bit setting; and Fig. 8 is an enlarged longitudinal cross-sectional view of the upper portion of the rivet cutter illustrating one type of adjustable chuck which may be used to secure the drill bit in the rivet cutter.

Similar reference characters refer to similar parts throughout the several views of the drawings and the specification.

Referring to the drawings, the improved rivet cutter comprises generally a driving member 1 which is attached to a power unit such as the power drill d. The driving member 1 receives the shank b' of a bit b. One end of the driving member 1 extends into a normally stationary sleeve 2. An expansion spring 3 is telescoped over a section of the driving member 1 and rests against a thrust bearing 4 locked within the stationary sleeve 2. The nose end of the stationary sleeve 2 carries a bit guide 5 shaped to engage the rivet head and properly center the cutting end of the drill bit.

The driving member 1 comprises more particularly a head portion 10 having a shank 11 extending from one end thereof. The shank 11 is shaped to conveniently fit into a suitable chuck associated with the power unit d. An elongated body portion of circular cross-section extends from the other end of the head portion 10. The body portion generally comprises a body section 12 of smaller diameter than the head portion 10 and extending therebelow, a reduced body section 13 of smaller diameter than body section 12 extending therebelow, and a body section 14 which may have a diameter slightly less than the body section 13 and extending therebelow. A relatively elongated bore 15 extends axially through the body sections 14, 13 and 12 and into the head portion 10. This bore provides a socket into which the bit shank b' is inserted.

The bit b is fixedly secured within the socket-forming bore 15 by a suitable adjustable securing means which may be an adjustable chuck or in its simplest form may comprise a set screw 16, as shown in Figs. 1 and 2. Where a set screw is used to secure the bit in fixed position, the set screw may extend through a threaded opening 17 in the head portion 10 and may be provided with a key socket 18 in which a suitable key may be inserted to manipulate the set screw and bring the end 19 thereof into gripping engagement with the shank portion b' of the bit.

The underside of the head portion 10 is provided with a circular-shaped recess 21 which receives the upper end of the coiled expansion spring 3. The upper end of the coiled spring 3 may be removably retained in recess 21 by means of an overhanging lip 22 forming a part of the head portion 10. The coiled spring 3 when fully extended encloses the body section 12 and a portion of the body section 13 but may be compressed so that the entire coil spring is contained upon the body section 12 and above the relatively sharp shoulder 23 which defines body section 12 from body section 13.

The reduced body section 13 supports the thrust bearing 4 comprising circular thrust plates 30 and 33 between which is disposed a circular bearing plate 31 fitted with a plurality of ball bearings 32. The thrust plates 30 and 33 and the bearing plate 31 are provided with concentric circular apertures 34 through which the reduced body section 13 extends. The concentric openings 34 in thrust plates 30 and 33 and bearing plate 31 are of such size that these parts can be telescoped onto the reduced body section 13 with the lower end of the expansion spring 3 bearing against thrust plate 30. The bearing 4 is retained on the reduced body section 13 by means of a collar 25 which is telescoped onto the reduced body section 14. The upper end of the collar 25 abuts against the shoulder 24 which defines the lower end of the body section 13. The collar 25 may be fixed to the reduced body section 14 by any suitable means, as by brazing or by a securing pin 26. It will be noted that the diameter of the collar 25 is slightly greater than the concentric opening 34 in the bearing plate 33, so that when the collar 25 is applied to the body section 14, the thrust bearing 4 and the coil spring 3 are retained upon the body sections 12 and 13 of the driving member 1. The bearing 4, however, is free to telescope upon the reduced body section 13 between the shoulder 23 and the upper end of the collar 25. The thrust plate 30 can be moved to abut the shoulder 23, in which event the coil spring 3 will be compressed and contained upon the shank section 12.

The normally stationary sleeve 2 comprises an enlarged body section 40, the outer surface 55 of which may be knurled to provide a convenient hand grip. The lower end of the body section 40 merges into a tapered shaving-discharge section 41 provided with a threaded nose section 42 at its lower end. The upper end of the body section 40 is provided with a cylindrical pocket 43 within which the bearing 4 may seat. The bearing-receiving pocket 43 adjacent its upper end is provided with a circular recess or groove 44 in which may be positioned a removable locking key which may be formed of a resilient ring segment 45. When the ring segment 45 is positioned within the circular groove 44, as shown more particularly in Figs. 2 and 3, the ring segment 45 will overlap and engage the outer periphery of the thrust plate 30 so as to firmly retain the bearing 4 within the bearing pocket 43 of the normally stationary sleeve 2.

The body section 40 of the sleeve 2 is provided with a relatively large central bore 46 within which is positioned a bushing 50. The bushing 50 may be made of bearing metal and fits tightly in the bore 46. The collar 25 has a smooth outer surface and is free to rotate within the bushing 50. The lower thrust plate 33 of the bearing 4 is normally stationary during operation of the cutter and may be held against rotation by the provision of suitable projections 48 on the shoulder 47 of the sleeve, which engage corresponding recesses in the bearing plate 33 to prevent rotation thereof. The upper thrust plate 30 is engaged by the lower end of the coil spring 3 and rotates with the driving member 1. The rotating bearing plate 30 and the stationary bearing plate 33 provide raceways for the ball bearings 32.

The tapered discharge section 41 is provided with an enlarged bore or cavity 51 for receiving the metal shavings cut off from the rivet head, which crawl up along the bit. A plurality of enlarged openings 52 extend laterally through the wall of the tapered section 41, providing discharge openings for the shavings. The cavity 51 may comprise a tapered bore or a cylindrical bore of the same diameter as the bore 46 in the body section 40. The nose section 42 is provided with a threaded bore 53 for receiving the threaded neck portion 60 of the bit guide 5.

The bit guide 5 is a precision instrument shaped to conform to and engage the head of the rivet to be removed. Thus a separate bit guide 5 is provided for each type and size of rivet so that rivets of different sizes having different types of heads may be removed by means of this rivet cutter by merely selecting and attaching the proper type of bit guide 5 to the nose end of the sleeve 2. All of the bit guides 5, however, have a threaded shank portion 60 which is screwed into the threaded nose 42 of the sleeve 2 and a shoulder 61 against which the flat end 54 of the nose section 42 is adapted to seat. The bit guides 5 are also provided with a central bore 62 through which the end of the bit $b$ may extend. The bore 62 is of such size as to rather snugly receive the lower end of the bit to guide the same without interfering with its free rotation. The lower end of the guide is provided with a pocket and a rim shaped to conform to the rivet head to be removed. The bit guides vary in length as well as in the shape and contour of the rivet-engaging end thereof. Each guide may be attached to and removed from the nose 42 of the sleeve 2 by means of a suitable key which may be inserted into a key-receiving opening 63 provided in the body of the guide. The threads on the shank portion 60 of the guide are turned so that when the guide is applied to the rivet head the rotation of the driving member will prevent the guide from loosening.

In removing a rivet head, it is important that the operating end $b''$ of the bit cuts down to the neck $rn$ of the rivet shank but not into the shank, since the bit might otherwise injure or enlarge the rivet hole in the riveted plates $s$ and $s'$ or otherwise injure or deface the surface of the adjacent plate $s$. The rivet cutter and associated bit guide is so constructed and proportioned that the end $b''$ of the bit cannot be driven into the rivet farther than the neck point $rn$ of the rivet. It will be noted by referring to Fig. 2 that the cutting end of the bit can be advanced only a fixed distance $x$, which distance is determined by the distance $x$ between the shoulder 23 and the bearing plate 30. In other words, when the driving member 1 is pushed toward the rivet against the action of the expansion spring to the point where the shoulder 23 seats against the upper bearing plate 30, the end $b''$ of the bit will be in its fully extended position, as shown in Fig. 4, and will project a fixed distance below the end 54 of the nose 42. When pressure on the driving member 1 is released the expansion spring 3 will telescope the driving member in the stationary sleeve 2 in the opposite direction until the lower bearing plate 33 seats against the upper end of the collar 25. In this position, the cutting end $b''$ of the bit is retracted to its greatest extent in the bit guide 5, as shown in Fig. 2. Thus it will be appreciated that the longitudinal length of the body portion of the bit guide, measured from its shoulder 62 to its rim, determines the distance which the cutting end of the bit can be telescoped into the rivet head receiving pocket at the lower end of the bit guide. The distance $x$ which the lower end of the bit is permitted to travel is, however, fixed and determined on each rivet cutter by the distance $x$ between the shoulder 23 and the top bearing plate 30 when the coil spring 3 is expanded and the bottom plate 33 abuts the end of the collar 25.

The bit guide for removing rivets $r$ having round heads $rr$, as shown in Figs. 2 and 4, have a cup-shaped pocket 64 in the end thereof shaped to generally conform to the outer surface contour of the round rivet head $rr$. The peripheral edge 65 which surrounds the cup-shaped pocket 64 is shaped to seat against the adjacent surface of the riveted plate $s$ which contains the rivet. When the cup-shaped end of the bit guide 5 is positioned over the round head $rr$ of the rivet $r$, the cup-shaped pocket will automatically swing the end of the guide into position so as to completely pocket the rivet head therein and position the bit bore 62 therein squarely over the center of the rivet and in line with the shank thereof. The length of the guide body, measured from its shoulder 61 to its rim 65, is such as to permit the cutting end $b''$ of the bit to cut into the round head $rr$ down to the neck $rn$ of the rivet but no farther.

In cutting brazer head rivets $r'$, as shown in Fig. 5, the bit guide 5 is provided with a saucer-shaped cavity 67 shaped to fit the outer surface of the brazer head $rb$ of the rivet $r'$, with the peripheral edge 68 of the guide seating against the adjacent surface of the riveted plate $s$. The body of the guide between the shoulder 61 and the rim 68 is of such length as to permit the cutting end $b''$ of the bit $b$ to cut into the relatively flat brazer head down to the neck $rn$ of the rivet. In the brazer head rivet the distance between the crown of the brazer head and the neck $rn$ of the rivet is less than the distance between the crown and the neck of a round head $rr$ on a rivet $r$ of comparable size, and accordingly the body length of the bit guide, measured from its shoulder 61 and its peripheral edge 68, is correspondingly greater than the distance between shoulder 61 and rim 65 of the bit guide used on round head rivets, as shown in Figs. 2 and 4. Thus by providing a bit guide of the proper body length and proper shaped end pocket, rivet heads of different shapes and sizes may be drilled and removed.

There is shown in Fig. 6 a bit guide 5 which is shaped to remove the heads of countersunk rivets $r''$. The guide used in removing countersunk heads are provided with a cone-shaped pocket 70 which sets over the rivet head and a sharp peripheral edge 71 which seats adjacent the perimeter of the countersunk head $rs$. In countersunk rivets a fine line defines the perimeter of the countersunk head from the surface and the countersunk hole in the plate $s$ into which the sharp peripheral edge 71 of the bit guide is adapted to seat. Thus the sharp peripheral edge 71 facilitates the location of the bit guide over the countersunk head so that the bore 62 thereof is in axial alignment with the body of the countersunk rivet $r''$. To remove such a countersunk head the cutting end $b''$ of the bit drills through the countersunk head $rs$ down to the neck portion $rn$ of the rivet, so that when the countersunk head has been fully drilled, the cutting end $b''$ of the bit will project a distance beyond the sharp edge 71 of the guide equal to the depth of the countersunk head $rs$. Thus the length of the body of the guide used for removing countersunk heads, measured by the axial distance between the shoulder 61 of the guide and the gripping edge 71 of the guide, would be somewhat less than the body length of the guide used in removing brazer heads, as shown in Fig. 5, or round heads, as shown in Figs. 2 and 4.

The rivet cutter kit is equipped with a number of guides, each shaped to fit a certain size of rivet of a certain head shape. In aircraft manufacture, for example, approximately twelve different types and sizes of rivets are used, which may be classified into four different shank dimensions having diameters respectively of $\frac{3}{32}$ inch, $\frac{1}{8}$ inch, $\frac{5}{32}$ inch and $\frac{3}{16}$ inch. A single rivet cutter of the type shown in Figs. 1 and 2 may be designed to receive four different bits having corresponding diameters. Thus the bore 15 of the driving member 1 may be of such size as to snugly receive the shank of the largest or $\frac{3}{16}$ inch size bit. In order that the smaller bits will snugly seat within the bore 15, the smaller bits may be provided with correspondingly enlarged shank portions $b'$ so that each shank portion $b'$ will have a diameter of approximately $\frac{3}{16}$ inch. Thus the shank portions $b'$ of each of the four bits will snugly fit within the bore 15 so that the bit will be properly centered within the bore and fixedly held by suitable gripping means, such as the set screw 16.

In aircraft manufacture, for example, rivets of three different head shapes are usually employed, such as rivets with round heads $rr$, brazer heads $rb$ and countersunk heads $rs$, making a total of three different types of rivets in four different sizes, or a total of twelve different rivets. The cutter kit would therefore be equipped with twelve different guides suitably marked and identified with the type of rivet with which each is to be used and, if desired, the kit may also be equipped with four bits of the different sizes. Thus a workman equipped with a power drill driven either electrically or by compressed air and a cutter kit equipped with a single rivet cutter unit, four bits of the above sizes, and twelve bit guides, would be prepared to remove the heads from all defective rivets of the sizes and types used in aircraft manufacture.

The kit may also be provided with a test cap 90, as shown in Fig. 7, which accurately determines the proper position of the cutting end $b''$ of the bit positioned within the rivet cutter. It will be appreciated that when the cutting end $b''$ of the bit is sharpened, the length of the bit becomes shortened so that the bit shank $b'$ will have to be fixed in the bore 15 in the proper position. Since the total telescoping movement $x$ of the cutting end $b''$ of the drill bit is fixed and determined for each rivet cutter, it will be appreciated that the distance which the lower end of the bit projects beyond the end 54 of the nose 42 when it is in its extreme retracted position must be constant. Thus if the bit, of whatever length, is so set in the rivet cutter that its end $b''$ projects beyond the end 54 of the nose 42 a fixed distance, as shown in Figs. 1, 2, 5 and 6, the bit will operate with precision and accuracy with all of the various bit guides with which the kit is equipped. When the coil spring 3 is fully expanded to carry the bit to its full retracted position, the end of the bit should project beyond the lower end 54 of the sleeve 2 the distance shown in Figs. 1, 2, 5, 6 and 7 when the bit is in its full retracted position. The proper setting of the bit may be quickly done by screwing the test cap 90 into the threaded bore 53 in the nose portion 42 of the sleeve member 2. The test cap 90 is provided with a shoulder 91 which seats against the end 54 of the nose 42 when its threaded shank 92 is fully screwed into the threaded bore 53 of the nose. The test cap 90 is provided with a bottom wall 93 which closes the end of a bore 94 into which the end of the drill bit may extend. A socket hole 96 may be provided in the body of the test cap 90 into which a suitable tool may be inserted to turn the test cap onto the threaded nose 42.

To adjust the shortened bit in the rivet cutter, the drill bit is inserted into the socket 15 in the driving member 1 and the test cap 90 screwed into place. A small bore 15 extends through the shank 11 of the driving member 1 into which a suitable instrument may be inserted which engages the top end of the bit and which may be used to push the bit downwardly so that its cutting end $b''$ telescopes into the socket 94 of cap 90 and seats against the inside surface 95 of the cap member. The bit clamping means, such as the set screw 16, is then tightened to hold and retain the bit tightly against the bit shank $b'$ to hold and fix the bit in this position. The test cap 90 is then removed and the selected bit guide put in its place. The operating end of the bit is then accurately and precisely positioned for use with all of the bit guides in the kit and with the assurance that the cutting end of the bit will drill through all the various rivet heads which the guides are adapted to fit, and will drill no farther than the neck point $rn$ of the rivet.

If desired, a device which forms a permanent part of the rivet cutter may be provided for sliding the bit $b$ in the socket 15 of the driving member. Such a device may comprise a shank screw 100, as shown in Fig. 8. In this construction, the shank 11 of the driving member 1 may be provided with a threaded bore 101 which is adapted to receive the threaded portion 102 of the shank screw 100. Shank screw 100 is provided with a shank portion 103 which snugly fits within a bore 104 in the head portion 105 of the driving member 1. By manipulating the shank screw 100, as by means of a socket wrench inserted into socket aperture 106 in the end of the screw, the lower end 107 of the screw may be advanced or retracted. The lower end 107 of the shank screw 100 is adapted to seat against the end of the shank b' of the bit b, so that when the shank screw 100 is manipulated the cutting end b'' of the bit may be pushed into seating engagement with the inside surface 95 of the test cap 90, as shown in Fig. 7.

The driving member 1 may, if desired, be equipped with a suitable chuck for gripping the shank b' of the bit, in place of the set screw 16 shown in Fig. 2. Where the smaller sized rivets are used, as in aircraft manufacture, the set screw 16 has been found to be amply sufficient to rigidly secure the drill bit in fixed position in driving member 1. Wherever large sized rivets are to be removed, it may be desirable to provide the driving member 1 with a chuck to hold the bit in fixed position. There is shown in Fig. 8 one type of chuck which may be associated with the driving member 1.

The chuck assembly shown in Fig. 8 is formed of two separable parts which together form the driving member 1. In this construction a stem portion 108 extends above the body section 12 which carries the coil spring 3, with the bit bore 15 extending through the stem section 108. A plurality of sockets 109, preferably three in number, are provided at the upper end of the stem section 108, each adapted to retain a steel ball 110. The upper end of the stem section is provided with a tapered surface 111 beyond which a peripheral portion 112 of each ball 110 projects. The balls 110 are so positioned and seated in their respective sockets 109 that a portion of the ball is adapted to grip the stem b' of the bit. Stem section 108 is provided with a threaded body 113 which terminates in a shoulder 114. A trunk portion 115 having a smooth outer surface and cylindrical in form, projects below the shoulder 114 and extends down to an outturned flange portion 116 which carries the circular lip 22 for retaining the upper end of the coil spring 3 in the recess 21.

A removable head 105 is provided with a downwardly extending skirt 120 which defines a pocket 121 into which the stem section 108 extends. The pocket 121 is provided with a tapered tubular inner surface 122 adapted to seat against the outer portion of the balls 110. The skirt 120 is provided with a threaded portion 123 below the tapered surface 122, which threaded portion is adapted to be screwed over the threaded portion 113 of the stem section 108. The lower end of the skirt 120 is provided with a removable rim member 124 having a threaded flange portion 125 adapted to be screwed onto the end of the threaded portion 123 of the skirt. The rim member 124 is provided with a circular opening through which the trunk portion 115 of the stem 108 extends. The head section 105 cannot be removed from the stem section 108 except by turning the rim member 124 off from the end of the sleeve 120. The head section 105 may be provided with an internal cavity 126 into which the upper end of the bit shank b' may extend so as to increase the permissible longitudinal adjustment of the bit.

To remove the bit from the chuck shown in Fig. 8, the head section 105 is turned so as to raise the tapered surface 121 thereof away from the balls 110 so that the balls 110 can move outwardly in their sockets 109 and release the bit. When the bit is reinserted, the head section 105 is turned down over the stem section 108 until the tapered cam surfaces 124 press the balls 110 into gripping engagement with the bit shank b'. Preferably only three balls 110 are used so that the bit shank is gripped at three points. It will be appreciated that the larger the bit stem the less distance the head section 105 can be turned down on the threaded stem section 108, and the smaller the diameter of the bit shank the farther the head section 105 can be turned down on the threaded stem section 108. Thus the chuck shown in Fig. 8 may be made to retain a grip on bit shanks of various diameters. It will be noted that the threads on the threaded portion 123 of the head skirt 120 are turned to correspond with the rotation of the shank 11 when driven by the power unit, so that the heavier the bit load the greater will be the grip exerted by the balls 110 on the bit shank b'. While the chuck arrangement shown in Fig. 8 provides an effective means for rigidly securing bit shanks of various diameters in the driving member 1, it will be appreciated that other types of chucks may be used for that purpose.

The rivet cutter constructed as above described provides a precision instrument whereby rivet heads can be accurately and precisely drilled at high speed. It is a tool which can be safely operated by unskilled workmen to quickly and effectively remove defective rivets. It is only necessary to know the type and size of rivets to be removed, select the corresponding drill bit size, fix it in the socket of the driving member with the position of the cutting end of the drill bit gauged by the gauge cap 90, and then apply the proper bit guide 5 which is numbered and marked with the type and size of rivet it is constructed to remove. When the proper bit guide 5 has been applied to the nose end of the sleeve 2, the operator throws on the power which operates the driving unit and places the pocket end of the bit guide over the rivet head. The pocket end of the bit guide is so shaped that the guide is self-centering on the rivet head when the driving member 1 is pressed toward the rivet head by exerting a light push on the driving unit which is held in one hand. The other hand of the operator holds the knurled sleeve 2, whose interior surfaces are spaced a substantial distance from the bit so that it will not heat.

The shavings cut from the rivet head follow the contour of the rivet into the enlarged chamber 51 from which they drop out through the enlarged opening 52. The sleeve 2 is so constructed as to baffle the metal shavings and splinters so that they drop out through the opening 52 without velocity. It is therefore unnecessary for workmen using this tool to wear either goggles or helmets, which have generally been worn when cutting the rivets with tools heretofore employed for this purpose.

It will be further noted that the bit guide 5 is so constructed and proportioned that the cutting end of the bit can be driven down to but not beyond the neck point $rn$ of the rivet. When the neck point has been reached the shoulder 23 will seat against the thrust plate 30 of the bearing so that it is impossible to cut farther into the rivet. The rivet head is fully and completely cut when the designated bit guide is attached to the nose end of the sleeve. This rivet cutter is substantially foolproof in operation and can be safely operated by relatively unskilled workmen with assurance that the rivet head will be properly and accurately cut down to the neck point of the rivet and no farther, so that the head of the rivet will drop off or can easily be pushed off and the rivet shank driven out of the rivet hole without damage to surrounding portions of the riveted plate and without enlarging or misshaping the rivet hole. Rivet heads can be removed with this efficient tool in a very few seconds. An industrious workman can remove the heads from thousands of defective rivets in a working day with this tool.

The improved rivet cutter herein disclosed can be constructed in substantially any size to remove numerous different types, kinds and sizes of rivets which must be removed during the construction and repair of aircraft, ship hulls, structural framing, railroad cars and vehicles, and in numerous other arts where rivets are employed to secure structural parts together. Further, fire hazard and injury to workmen are completely avoided, which is a serious drawback to use of cutting, drilling, chipping, and blow torch tools heretofore employed for this purpose. Furthermore, the rivets can be removed by relatively unskilled workmen at several times the speed at which this operation can be accomplished by the instrumentalities heretofore provided for this purpose and with the assurance that the rivet holes left by the rivets will not be distorted or enlarged or the surface of the structural parts injured or disfigured.

While certain novel features of the invention have been disclosed and are pointed out in the annexed claims, it will be understood that various omissions, substitutions and changes may be made by those skilled in the art without departing from the spirit of the invention.

What is claimed is:

1. A rivet cutter including, a driving member having a driving shank for attachment to a power unit and a body section having a bit receiving socket, means for removably securing the bit in said socket, a non-rotating guide sleeve, a thrust bearing seating in said sleeve having an aperture through which said body section extends, means for limiting the longitudinal separating movement of said driving member and guide sleeve, an expansion spring surrounding said body section and interposed between a shoulder on said driving member and said thrust bearing for yieldingly holding said driving member and sleeve relatively separated to the extent permitted by said limiting means, and a bit guide at the end of said sleeve having a passage to receive and guide the bit secured in the socket of said driving member.

2. A rivet cutter including, a driving member having a driving shank for attachment to a power unit and a body section having a bit receiving socket, means for removably securing the bit in said socket, a non-rotating guide sleeve, a thrust bearing seating in said sleeve having an aperture through which said body section extends, means for limiting the longitudinal separating movement of said driving member and guide sleeve, an expansion spring surrounding said body section and interposed between a shoulder on said driving member and said thrust bearing for yieldingly holding said driving member and sleeve relatively separated to the extent permitted by said limiting means, and a bit guide removably secured to the end of said sleeve having a passage to receive and guide the bit secured in the socket of said driving member, the outer end of said drill guide being contoured to fit a rivet head.

3. A rivet cutter comprising, a driving member having a driving shank at one end for engagement in a bit chuck and a body section at the opposite end having a bit receiving socket, means for removably securing said bit in said socket, a non-rotating guide sleeve, a bearing telescoping over said body section and removably secured to said sleeve, means associated with said body section for limiting the longitudinal separating movement of said driving member and guide sleeve, an expansion spring interposed between a shoulder on said driving member and said bearing for yieldingly holding said sleeve and driving member relatively separated to the extent permitted by said limiting means, and a bit guide at the end of said sleeve having a passage to receive and guide the bit secured in the socket of said driving member.

4. A rivet cutter comprising, a driving member having a driving shank at one end for engagement in a chuck and a body section at the opposite end having a bit receiving socket, means for removably securing said bit in said socket, a non-rotating guide sleeve receiving said body section, a balled bearing telescoping over said body section and removably secured to said sleeve, means associated with said body section for limiting the longitudinal separating movement of said driving member and guide sleeve, means for yieldably holding said driving member and guide sleeve relatively separated to the extent permitted by said limiting means, and a bit guide removably secured to the end of said sleeve, said bit guide having a passage to receive and guide the bit and an outer end portion contoured to fit a rivet head.

5. A rivet cutter comprising, a driving member having a driving shank for attachment to a power unit and a body section having a bit receiving socket, means for removably securing said bit in said socket, a thrust bearing telescoping over said body section, means on said body section for limiting the telescoping movement of said bearing, a guide sleeve having a bore receiving a portion of said body section, means for securing said bearing to said sleeve, means for yieldably holding said driving member and guide sleeve relatively separated to the extent permitted by said limiting means, and a bit guide removably secured to the end of said sleeve, said bit guide having a passage to receive and guide the bit and an outer end portion contoured to fit a rivet head.

6. A rivet cutter comprising, a driving member having a shank portion for insertion into a drill chuck and a stem portion having an elongated drill receiving socket, a non-rotating guide sleeve receiving said stem portion and in which said stem is longitudinally shiftable, and a drill guide at the end of said sleeve having a passage to receive and guide the drill and an outer end portion having a conical seat to accommodate a rivet head and a rim to fit about a rivet head and centralize the drill on said rivet.

7. A rivet cutter comprising, a driving member having a shank portion for insertion into a drill chuck and a stem portion having an elongated drill receiving socket, a non-rotating guide sleeve receiving said stem portion and in which said stem is longitudinally shiftable, and a drill guide at the end of said sleeve having a passage to receive and guide the drill and an outer end portion having a conical seat to accommodate a rivet head and a relatively sharp edge to fit about a rivet head and centralize the drill on said rivet.

8. A rivet cutter comprising, a driving member having a driving shank for attachment to a chuck and a body section provided with an elongated bit receiving socket, a non-rotating guide sleeve, a bearing telescoping over said body section, said sleeve having a pocket within which said bearing seats, means for securing said bearing in said pocket, an expansion spring positioned between a shoulder on said driving member and said bearing for relatively shifting the driving member and sleeve in a longitudinal separating direction, shoulders on said body section for limiting the extent of such longitudinal separating movement, and a bit guide at the end of said sleeve having a passage receiving and guiding the bit and a rim in the end of the same for centering the guide on a rivet head.

9. A rivet cutter comprising, a driving member having a driving shank for attachment to a chuck and a body section provided with an elongated bit receiving socket, a non-rotating guide sleeve, a bushing fixed in said guide sleeve into which said body section extends, a bearing telescoping over said body section, said sleeve having a pocket within which said bearing seats, means for securing siad bearing in said pocket, an expansion spring positioned between a shoulder on said driving member and said bearing for relatively shifting the driving member and sleeve in a longitudinal separating direction, shoulders on said body section for limiting the extent of such longitudinal separating movement, and a bit guide at the end of said sleeve having a passage receiving and guiding the bit and a rim on the end of the same for centering the guide on a rivet head.

10. A rivet cutter comprising, a driving member having means for attaching it to a driving unit and a body section having a bit receiving socket, means for removably securing a bit in said socket, a non-rotating guide sleeve having an enlarged section into which said stem is longitudinally shiftable and a tapered nose section, means for shifting said driving member and guide sleeve in a longitudinal separating direction, means for limiting the extent of said shifting movement, and a bit guide secured to the end of said tapered section, said tapered section having an enlarged shavings receiving chamber and shavings outlet ports leading therefrom.

11. A rivet cutter comprising, a driving member having means for attachment to a driving unit and a body section having a bit receiving socket, a non-rotating guide sleeve having an enlarged section and a tapered section, a bearing telescoping over said body section and secured to the enlarged section of said sleeve, an expansion spring seating between a shoulder on said driving member and the bearing fixed to said guide sleeve for relatively shifting the driving member and sleeve in a longitudinal separating direction, means for limiting the extent of said shifting movement, and a drill guide secured to the tapered section of said sleeve having a passage receiving and guiding the bit and a means at the end thereof for centering the guide over a rivet head, said tapered section having an enlarged shavings receiving chamber communicating with the passage in said guide and a plurality of outlet ports extending laterally from said chamber.

12. A rivet cutter comprising, a driving member having a driving shank at one end for attachment to a chuck and a stem at the opposite end provided with a drill receiving socket, means for removably securing said drill in said socket, a non-rotating guide sleeve having a bearing fixed therein telescoping over said stem and in which said stem is longitudinally shiftable, an expansion spring positioned between a shoulder on said driving member and said bearing for relatively shifting the driving member and sleeve in a longitudinal separating direction, means for limiting the extent of such shifting movement, and a drill guide removably secured to the end of said sleeve having a passage receiving and guiding the drill and a pocket in the end of the same for receiving a rivet head having a surrounding relatively fine edge.

13. For use with a drill bit fixed to a driving member having a predetermined telescoping movement in a relatively stationary sleeve, of a bit guide for centering the cutting end of the bit on a rivet head, means for removably securing said guide to the end of said sleeve, said guide having a passage for receiving and guiding the cutting end of the bit and an outer end portion contoured to fit a rivet head.

14. For use with a drill bit fixed to a driving member having a predetermined telescoping movement in a relatively stationary sleeve, of a bit guide for centering the cutting end of the bit on a rivet head, means for removably securing said guide to the end of said sleeve, said guide having a passage for receiving and guiding the cutting end of the bit and an end portion contoured to fit the round head of a rivet.

15. For use with a drill bit fixed to a driving member having a predetermined telescoping movement in a relatively stationary sleeve, of a bit guide for centering the cutting end of the bit on a rivet head, means for removably securing said guide to the end of said sleeve, said guide having a passage for receiving and guiding the cutting end of the bit and an end portion contoured to fit the brazer head of a rivet.

16. For use with a drill bit fixed to a driving member having a predetermined telescoping movement in a relatively stationary sleeve, of a bit guide for centering the cutting end of the bit on a rivet head, means for removably securing said guide to the end of said sleeve, said guide having a passage for receiving and guiding the cutting end of the bit and an end portion contoured to fit the countersunk head of a rivet.

17. For use with a drill bit fixed to a driving member having a predetermined telescoping movement in a relatively stationary sleeve, of a bit guide for centering the cutting end of the bit on a rivet head, means for removably securing said guide to the end of said sleeve, said guide having a passage for receiving and guiding the cutting end of the bit and an outer end portion contoured to fit the rivet head, the axial length of the body of said guide being such as to permit the cutting end of the bit to drill into a rivet head down to the neck point of the rivet.

18. For use with a drill bit adjustably secured to a driving member having a predetermined telescoping movement in a relatively stationary sleeve, of a gauge cap adapted to be removably attached to the end of said sleeve for locating the position of the cutting end of said bit.

MALAND F. BURNS, Jr.